United States Patent [19]

Männer et al.

[11] Patent Number: 5,503,749
[45] Date of Patent: Apr. 2, 1996

[54] PROCESS FOR THE PURIFICATION OF AQUEOUS SOLUTIONS OF AMINE-OXIDES

[75] Inventors: Johann Männer, Weyregg; Heinrich Firgo, Vöcklabruck; Wolfram Kalt, Lenzing; Werner Richardt, Attersee, all of Austria

[73] Assignee: Lenzinc Aktiengesellschaft, Austria

[21] Appl. No.: 424,266

[22] PCT Filed: Aug. 2, 1994

[86] PCT No.: PCT/AT94/00105

§ 371 Date: Apr. 19, 1995

§ 102(e) Date: Apr. 19, 1995

[87] PCT Pub. No.: WO95/05888

PCT Pub. Date: Mar. 2, 1995

[30] Foreign Application Priority Data

Aug. 26, 1993 [AT] Austria .................................. 1718/93

[51] Int. Cl.⁶ .................................................. B01D 15/04
[52] U.S. Cl. ........................... 210/638; 210/644; 210/649
[58] Field of Search ....................... 210/638, 644, 210/649, 664, 670; 106/163.1; 204/182.3, 182.4

[56] References Cited

U.S. PATENT DOCUMENTS

| | | | |
|---|---|---|---|
| 3,132,095 | 5/1964 | Wolf et al. | 210/638 |
| 3,165,415 | 1/1965 | Kilburn et al. | 426/239 |
| 3,454,490 | 7/1969 | Wallace | 210/638 |
| 4,306,946 | 12/1981 | Kim | 210/644 |
| 4,769,152 | 9/1988 | Igawa et al. | 204/638 |
| 5,000,832 | 3/1991 | Steiniger et al. | 204/182.4 |
| 5,043,075 | 8/1991 | Dietmar et al. | 210/664 |
| 5,053,138 | 10/1991 | Korger et al. | 210/670 |
| 5,409,532 | 4/1995 | Astegger et al. | 106/163.1 |

FOREIGN PATENT DOCUMENTS

| | | |
|---|---|---|
| 0378081 | 1/1990 | European Pat. Off. . |
| 0402347 | 5/1990 | European Pat. Off. . |
| 0427701 | 10/1990 | European Pat. Off. . |
| 0427702 | 11/1990 | European Pat. Off. . |
| 93/11287 | 6/1993 | WIPO . |

OTHER PUBLICATIONS

"Ullmann's Encyclopedia of Industrial Chemistry", 1991, p. 213, col. 2, lines 7–12.

Simpson, C. F. "Techniques in Liquid Chromatography", 1982, p. 249, par. 3; p. 283, par. 2; and p. 321.

Primary Examiner—Ana M. Fortuna
Attorney, Agent, or Firm—Brumbaugh, Graves, Donohue & Raymond

[57] ABSTRACT

A process for the purification of aqueous solutions of amine-oxides, characterized in that said solutions are contacted with an aqueous purification solution of an alkali hydroxide and/or ion pair reagent by means of an anion active membrane. By means of the process according to the invention, an efficient separation, particularly of anions of lower carboxylic acids and inorganic acids, can be achieved.

3 Claims, 1 Drawing Sheet

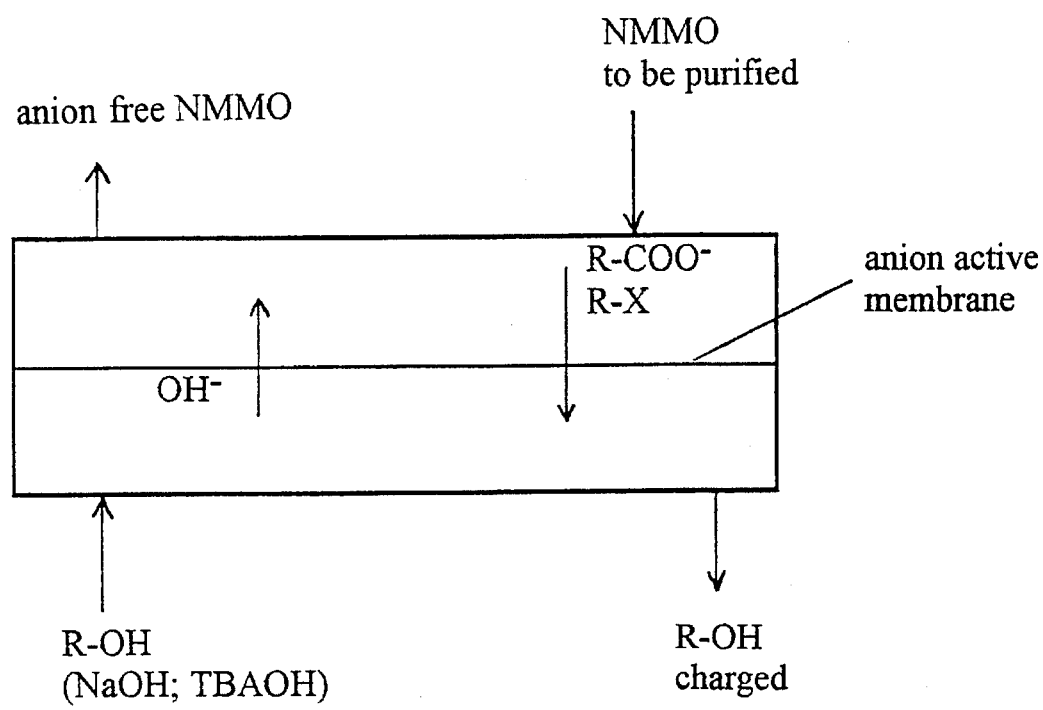
Figure

PROCESS FOR THE PURIFICATION OF AQUEOUS SOLUTIONS OF AMINE-OXIDES

The invention is concerned with a process for the purification of aqueous solutions of amine-oxides, particularly spent spinning bath liquid.

It is known that when producing solutions of cellulose in tertiary amine-oxides degradation reactions of the cellulose and the amine-oxide occur. The solvent most frequently used is N-methylmorpholine-N-oxide (NMMO). This solvent has been studied as an alternative for the viscose process, presenting the advantage that it may be conducted in a closed cycle.

The degradation reaction causes various products to develop which enrich due to the cyclic conduction of the NMMO process (in the following, NMMO is meant to refer to tertiary amine-oxides in general), interfering increasingly with the process. A particularly problematic class of substances are lower carboxylic acids, such as formic acid.

To assure a constant quality of the materials used in a closed solvent cycle, it is necessary to continuously remove degradation products or problematic substances from the solvent cycle. It is the object of the invention to provide a process for the purification of aqueous solutions of amine-oxides, particularly spinning bath liquids resulting from the NMMO process, providing particularly the efficient removal of anions of carboxylic acids and inorganic acids. For these substances, there has not yet been developed an efficient separation process.

The process for the purification of aqueous solutions of amine-oxides according to the invention is characterized in that the solutions are contacted with an aqueous purification solution of an alkali hydroxide and/or ion pair reagent by means of an anion active membrane.

It has been shown that in this way anions of carboxylic acids and anions of inorganic acids are removed from aqueous solutions of tertiary amine-oxides or exchanged for $OH^-$ ions in a particularly efficient manner.

It has proven particularly convenient to conduct the solution to be purified in counterflow to the purification solution of the alkali hydroxide and/or ion pair reagent.

Preferably, the purification solution contains of from 0,01 to 1,0 mole of NaOH or tetrabutylammonium hydroxide per liter.

BRIEF DESCRIPTION OF THE FIGURE

By means of the following Examples and the drawing (FIGURE), an embodiment of the invention will be illustrated in more detail.

DETAILED DESCRIPTION

The drawing schematically represents a cell divided into two chambers by means of an anion active membrane. The NMMO solution to be purified is introduced into the upper chamber shown in the FIGURE at one end, flows along the membrane and is withdrawn purified at the other end. In the lower chamber, the purification liquid is conducted in counterflow. The arrows indicate the direction of transportation of the liquids and the migration of the ions.

By means of the schematically represented cell, different NMMO solutions contaminated with formiate, $Cl^-$, $NO_2^-$, $NO_3^-$, $PO_4^{3-}$, $SO_4^{2-}$ and/or oxalate were purified. As a purification medium ($R-OH^-$) an aqueous solution of NaOH was used, 1000 ml of NMMO solution being purified with 6000 ml of NaOH (0,7 ml/min) in total. The aqueous sodium hydroxide was conducted in a cycle. The tests were carried out for approx. 24 hours. The results are indicated below.

EXAMPLE 1

NMMO solution (purification by means of TBAOH; 0,1 mole/l))

| ppm | NMMO | Formiate | $Cl^-$ | $NO_2^-$ | $NO_3^-$ | $PO_4^{3-}$ | $SO_4^{2-}$ | Oxalate |
| --- | --- | --- | --- | --- | --- | --- | --- | --- |
| before purification | 10,17% | 131,0 | 0 | 3 | 12 | 12 | 0 | 2 |
| after purification | 9,91% | 1,4 | 0 | 0 | 0,4 | 0 | 0 | 0 |

Formiate reduction = 99% (Formiate = anion of formic acid)

EXAMPLE 2

NMMO solution (purification by means of NaOH; 0,1 mole/l)

| ppm | NMMO | Formiate | $Cl^-$ | $NO_2^-$ | $NO_3^-$ | $PO_4^{3-}$ | $SO_4^{2-}$ | Oxalate |
| --- | --- | --- | --- | --- | --- | --- | --- | --- |
| before purification | 10,17% | 131,0 | 0 | 3 | 12 | 12 | 0 | 2 |
| after purification | 9,94% | 1,5 | 0 | 0 | 0,1 | 0 | 0 | 0 |

Formiate reduction = 99%

EXAMPLE 3

NMMO solution (purification by means of NaOH; 0,1 mole/l)

| ppm | NMMO | Formiate | Cl⁻ | NO₂⁻ | NO₃⁻ | PO₄³⁻ | SO₄²⁻ | Oxalate |
|---|---|---|---|---|---|---|---|---|
| before purification | 10,02% | 198 | 66,0 | 0 | 1,5 | 0 | 29,3 | 3,2 |
| after purification | 9,12% | 4 | 0,2 | 0 | 0,5 | 0 | 0,4 | 0 |

Formiate reduction = 98%

EXAMPLE 4

NMMO solution (purification by means of NaOH; 0,1 mole/l)

| ppm | NMMO | Formiate | Cl⁻ | NO₂⁻ | NO₃⁻ | PO₄³⁻ | SO₄²⁻ | Oxalate |
|---|---|---|---|---|---|---|---|---|
| before purification | 9,95% | 126,0 | 6,7 | 6,2 | 12,3 | 19,3 | 1,1 | 2,5 |
| after purification | 10,20% | 7,0 | 0,5 | 0,4 | 0,2 | 0 | 1,8 | 0,5 |

Formiate reduction = 95%

In the Tables, the concentration of all acid anions is indicated in ppm. TBAOH=Tetrabutylammonium hydroxide.

We claim:

1. A process for the purification of aqueous solution of amine-oxides containing anions of carboxylic acids and inorganic acids, said process comprising contacting said solutions with and aqueous purification solution of an alkali hydroxide and/or ion pair reagent by means of an anion active membrane and removing said carboxylic acids and inorganic acids from said amine-oxides solutions.

2. A process according to claim 1, wherein said solution to be purified is conducted in counterflow to said purification solution of the alkali hydroxide and/or ion pair reagent.

3. A process according to one of the claims 1 or 2 wherein said purification solution contains of from 0.01 to 0.1 mole of alkali hydroxide and/or ion pair reagent per liter, wherein said alkali hydroxide is NaOH, and said ion pair reagent is tetrabutylammonium hydroxyde.

* * * * *

UNITED STATES PATENT AND TRADEMARK OFFICE
CERTIFICATE OF CORRECTION

PATENT NO. : 5,503,749
DATED : April 2, 1996
INVENTOR(S) : Johann Manner, Heinrich Firgo, Wolfram Kalt and Werner Richardt It is certified that error appears in the above-indentified patent and that said Letters Patent is hereby corrected as shown below:

Title page, Item 73, "Lenzinc" should read --Lenzing--

Col. 1, line 59, "contains of" should read --contains--

Col. 3, line 30, "and aqueous" should read --an aqueous--

Col. 4, line 26, "contains of" should read --contains--

Col. 4, line 29, "hydroxyde" should read --hydroxide--

Signed and Sealed this

Thirtieth Day of July, 1996

Attest:

BRUCE LEHMAN

Attesting Officer    Commissioner of Patents and Trademarks